United States Patent
Fogarty

(10) Patent No.: US 8,788,386 B1
(45) Date of Patent: Jul. 22, 2014

(54) AUTOMATED MARKET MAKER AND RELATED METHODS AND IMPROVEMENTS

(71) Applicant: Mindjet LLC, San Francisco, CA (US)

(72) Inventor: Matthew John Fogarty, Palo Alto, CA (US)

(73) Assignee: Mindjet LLC, San Francisco, CA (US)

( * ) Notice: Subject to any disclaimer, the term of this patent is extended or adjusted under 35 U.S.C. 154(b) by 0 days.

(21) Appl. No.: 13/741,336

(22) Filed: Jan. 14, 2013

Related U.S. Application Data

(63) Continuation of application No. 12/172,140, filed on Jul. 11, 2008, now Pat. No. 8,380,595.

(60) Provisional application No. 60/950,700, filed on Jul. 19, 2007, provisional application No. 60/955,826, filed on Aug. 14, 2007.

(51) Int. Cl.
 *G06Q 40/00* (2012.01)

(52) U.S. Cl.
 CPC ........................... *G06Q 40/00* (2013.01)
 USPC ................ 705/35; 705/37; 705/39; 705/36 R

(58) Field of Classification Search
 CPC ........................................................ G06Q 40/00
 USPC ................................................................ 705/35
 See application file for complete search history.

(56) References Cited

U.S. PATENT DOCUMENTS 6,912,511 B1 * 6/2005 Eliezer et al. ................... 705/37
8,612,331 B2 * 12/2013 Hanson et al. .................. 705/37
2005/0228739 A1 * 10/2005 Leibowitz ....................... 705/37

OTHER PUBLICATIONS

"Economic Derivatives Markets-New Opportunities for Individual Investors: A Research Agenda", Financial Services Review, Robert Dubil, v1 6n2, pp. 89-104, Summer 2007.*

* cited by examiner

*Primary Examiner* — Hai Tran
(74) *Attorney, Agent, or Firm* — Law Office of Marc Schuyler

(57) ABSTRACT

Various problems currently exist in the operation of using prediction markets for corporate forecasting. One of these problems we address is the problem related to the "consistency and consolidation of metrics". We hierarchically structure and link sets of markets traded using an automated market maker and dynamically balance markets.

19 Claims, 4 Drawing Sheets

|  | Regions | | | |
|---|---|---|---|---|
| Products | Reg 1 | Reg 2 | Reg 3 | WW |
| Sports product A | 10 | 5 | 3 | 18 |
| Sports product B | 15 | 7 | 2 | 24 |
| Sports product C | 5 | 10 | 2 | 17 |
| Sports products | 30 | 22 | 7 | 59 |
| Driving product | 5 | 8 | 4 | 17 |
| Household product | 4 | 5 | 2 | 11 |
| Other products | 12 | 9 | 6 | 27 |
| Total Revenue | 51 | 44 | 19 | 114 |

Reg 1 total (51) can be drilled down to show product data

WW (114) can be drilled down to show regional data

|  | Regions | | | |
| Products | Reg 1 | Reg 2 | Reg 3 | WW |
| Sports product A | 10 | 5 | 3 | 18 |
| Sports product B | 15 | 7 | 2 | 24 |
| Sports product C | 5 | 10 | 2 | 17 |
| Sports products | 30 | 22 | 7 | 59 |
| Driving product | 5 | 8 | 4 | 17 |
| Household product | 4 | 5 | 2 | 11 |
| Other products | 12 | 9 | 6 | 27 |
| Total Revenue | 51 | 44 | 19 | 114 |

Reg 1 total (51) can be drilled down to show product data

WW (114) can be drilled down to show regional data

*Fig. 1*

| | | |
|---|---|---|
| WW sales of Sports products | 59 | In discrete |
| WW sales of Driving products | 17 | markets, sum |
| WW sales of Household products | 11 | of the parts |
| WW sales of other products | 27 | may not equal |
| WW revenue of all products | 120 | total |

*Fig. 2*

|  | Regions | | | |
| Products | Reg 1 | Reg 2 | Reg 3 | WW |
| Sports product A | 10 | 5 | 3 | 18 |
| Sports product B | 15 | 7 | 2 | 24 |
| Sports product C | 5 | 10 | 2 | 17 |
| Sports products | 30 | 22 | 7 | 59 |
| Driving product | 5 | 8 | 4 | 17 |
| Household product | 4 | 5 | 2 | 11 |
| Other products | 12 | 9 | 6 | 27 |
| Total Revenue | 51 | 44 | 19 | 114 |

*Fig. 3*

1 added to bottom level metric due to trading action

|  | Regions | | | |
| Products | Reg 1 | Reg 2 | Reg 3 | WW |
| Sports product A | 11 | 5 | 3 | 19 |
| Sports product B | 15 | 7 | 2 | 24 |
| Sports product C | 5 | 10 | 2 | 17 |
| Sports products | 31 | 22 | 7 | 60 |
| Driving product | 5 | 8 | 4 | 17 |
| Household product | 4 | 5 | 2 | 11 |
| Other products | 12 | 9 | 6 | 27 |
| Total Revenue | 52 | 44 | 19 | 115 |

Summary metrics are adjusted by +1 as they are sums of the bottom level metrics

*Fig. 4*

|  | Before | | | After | | |
|---|---|---|---|---|---|---|
|  | Reg 1 | % of total | | Reg 1 | % of total | |
| Sports product A | 11 | 35% | | 12.1 | 35% | 2) Bottom level |
| Sports product B | 15 | 48% | | 16.5 | 48% | metrics are |
| Sports product C | 5 | 16% | | 5.5 | 16% | adjusted |
| Sports products | 31 | | | 34 | | proportionally |

1) Summary metric is traded from 31 to 34

*Fig. 5*

| | Regions | | | |
|---|---|---|---|---|
| Products | Reg 1 | Reg 2 | Reg 3 | WW |
| Sports product A | 12.1 | 5 | 3 | 20.1 |
| Sports product B | 16.5 | 7 | 2 | 25.5 |
| Sports product C | 5.5 | 10 | 2 | 17.5 |
| Sports products | 34 | 22 | 7 | 63 |
| Driving product | 5 | 8 | 4 | 17 |
| Household product | 4 | 5 | 2 | 11 |
| Other products | 12 | 9 | 6 | 27 |
| Total Revenue | 55 | 44 | 19 | 118 |

3) Other summary metrics adjust

*Fig. 6*

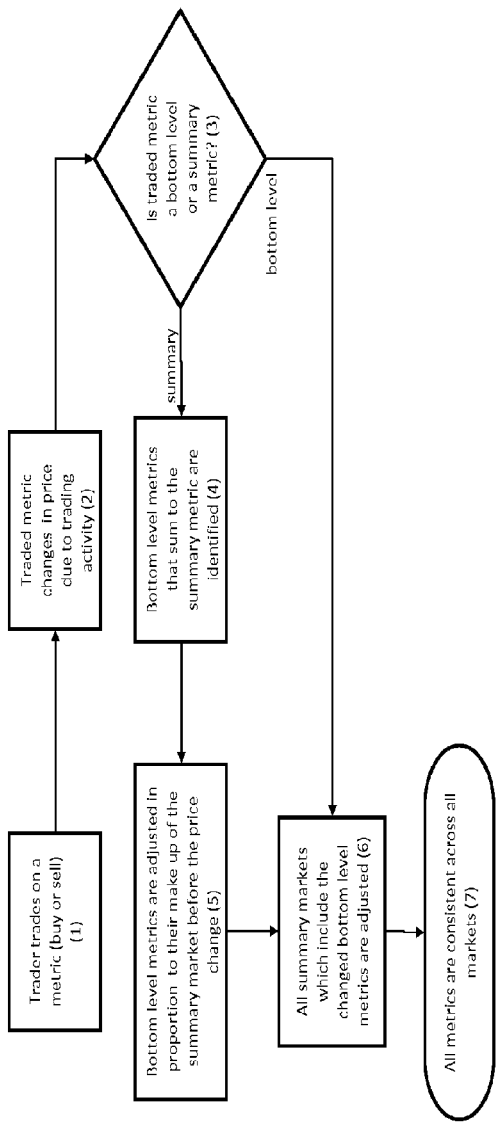

Fig. 7

Notes on Fig. 7

(1) The trader finds a metric that they believe presents opportunities for profitable trading. The trader trades on this metric (buys or sells the stock).
(2) The buying or selling of the metric changes the price of the metric
(3) The metric is tagged as a bottom level metric or as a summary metric
(4) Summary metrics are tagged with the bottom level metrics which they are made up of
(5) Bottom level metrics related to the summary metric which has just been traded are adjusted relative to (e.g. in proportion to their share of) the total summary metric before the trade. As all markets are traded using an automated market maker, the price can be adjusted using the market maker.
(6) The other summary metrics which sum up the bottom level metrics adjusted in step 5 (or step 1) are recalculated and the price adjusted using the automated market maker in that market.

AUTOMATED MARKET MAKER AND RELATED METHODS AND IMPROVEMENTS

CROSS REFERENCE TO RELATED APPLICATIONS

This application is a continuation of U.S. patent application Ser. No. 12/172,140, filed on Jul. 11, 2008 for "Prediction Market Roll Up" on behalf of inventor Matthew John Fogarty; in turn, U.S. patent application Ser. No. 12/172,140 claims priority under 35 USC 119(e) to provisional application No. 60/955,826 filed Aug. 14, 2007 and to provisional application No. 60/950,700 filed Jul. 19, 2007. Each of U.S. patent application Ser. No. 12/172,140 and the aforementioned provisional applications are hereby incorporated by reference in their entirety.

STATEMENT REGARDING FEDERALLY SPONSORED RESEARCH OR DEVELOPMENT

No federal funds have been used for research and development.

BACKGROUND

We address various fundamental problems in the use of prediction markets for corporate forecasting.
Prediction Markets Prediction markets are speculative markets created for the purpose of making predictions. Assets are created whose final value is tied to a particular event (e.g., will the next US president be a Republican) or metric (e.g., total sales next quarter). The current market prices (in the prediction market) can then be interpreted as predictions of the probability of the event or the expected value of the metric. Other names for prediction markets include information markets, decision markets, idea futures, event derivatives, and virtual markets.

Prediction markets can be traded using a continuous double auction (matching of buy and sell orders) or an automated market maker.
Corporate Forecasting Many corporations and organizations forecast their future financial and operational results. These forecasts are typically structured using bottom-up assumptions and inputs. For example, when forecasting sales revenue for the next fiscal year, the forecast could be constructed using revenue per product per region per month. A typical multinational organization may forecast sales on 100 products in 50 countries over 12 months, this would equate to approximately 60,000 inputs (100×50×12). Forecasts are then consolidated to more summary levels and retain consistency through simple math (e.g. Worldwide annual sales of product A=sum of sales for product A across all months across all countries).

Depending on the requirements and the analysis, this forecast can be reported at multiple levels—product A, in Region B in Month 4, or total sales for the year in Region B, or total sales of product D over the first half of the year for example. For these types of analysis, the data should be consistent, for example, the sum of all regions equals the world wide total. In this way, summary data can be "drilled down" to show bottom level data. For example, FIG. 1 shows how worldwide summary data can be drilled down to show regional summary data, and regional summary data can be drilled down to show bottom level product data for that region.

SUMMARY

Various problems currently exist in the operation of using prediction markets for corporate forecasting. One of these problems we address is the problem related to the "consistency and consolidation of metrics".

We address this problem by hierarchically structuring and linking sets of markets traded using an automated market maker and dynamically balancing markets using an algorithm.

BRIEF DESCRIPTION OF THE DRAWINGS

FIG. 1 shows how worldwide summary data can be drilled down to show regional summary data, and regional summary data can be drilled down to show bottom level product data for that region.

FIG. 2 shows data of a set of five discrete prediction markets.

FIG. 3 illustrates an example data set, where each data item represents a forecast sales figure in dollars.

FIG. 4 is an example of data on which a trade may be made, and FIG. 5 illustrates a result of the trade.

FIG. 6 illustrates an example in which the bottom level metrics are adjusted, and the summary metrics related to the adjusted bottom level metrics are adjusted to maintain consistency.

FIG. 7 is a flowchart illustrating an example of how the prediction market rollup methodology may be implemented.

DETAILED DESCRIPTION

The Problem

To date, prediction markets used for corporate forecasting have been based on sets of discrete forecasted metrics. For example, a set of prediction markets may have a market forecasting a particular region's revenue in a particular time period, or a market forecasting world wide revenue. However, because each of these markets is traded separately from the other markets, it is unlikely that the set of markets will be consistent. Without this consistency, it is challenging to interpret the data. For example, FIG. 2 below shows a set of 5 discrete markets. To be consistent, the result for the first 4 markets should sum to the result for the last market (Total revenue should equal the sum of the revenue per category). However, because the markets are separate, it is not clear if the total should equal 114 (sum of product markets) or 120.

One solution to this problem could be for the corporation to operate only discrete prediction markets on the metrics at the lowest levels. For the multinational in the example above (100 products in 50 countries over 12 months), this would mean running 60,000 discrete prediction markets on the metrics at the lowest level. For summary metrics, world wide revenue for example, the bottom level forecasts could be summed up.

However, for prediction markets to work well, there should be a sufficient number of traders (wisdom of crowds) and sufficient liquidity in each market. Having a very high number of markets, given a limited number of potential traders, would lead to low liquidity in each market, and poor quality forecasts. In addition, many potential participants (especially higher up in the organization) can judge the accuracy of a forecast better at the summary level (e.g. world wide revenue) and may find it difficult to judge accuracy at the bottom level (e.g. sales on product C in Region E in month 7), and so would be unlikely to trade.

In summary, with current methods, it is difficult to use prediction markets for corporate forecasting while maintaining consistency of data between bottom level and consolidated (summary) forecasted metrics.

The Prediction Market Roll Up Solution

We address some or all of these issues using a "Prediction Market Roll Up" (PMRU).

The essence of PMRU is to build a hierarchy of linked markets representing bottom level and summary forecasted metrics. Any metrics (bottom level and summary) can be traded using a prediction market using an automated market maker and all metrics related to the traded data point are adjusted to maintain data consistency.

Example of Intended Use

To explain an example of the PMRU solution, we show how a company can forecast revenue from various products in 3 regions over a single period. The company is interested in the bottom level forecasts (product sales by region) and various summary forecasts—the total revenue for a category of products (sports products), the worldwide revenue by product, total revenue by region and total revenue worldwide.

The example starts with a data set in FIG. 3. Each figure represents the forecast sales in dollars.

Markets are then set up on all the metrics. In this example there are 32 different metrics, 18 bottom level metrics (for a specific product and region) and 14 summary metrics. Therefore there are 32 different potential markets to trade.

Trading on a Bottom Level Forecast

If a trader believes that the forecast for Sports Product A in Reg 1 (10) was too low, the trader could trade (buy shares) in that market which would increase the value of that particular metric. In our example, this buying activity increases the metric from 10 to 11.

In the PMRU solution, the summary markets (boxed) related to this bottom level market adjust automatically by adding 1 to their price (representing the forecast). In this way the data set remains consistent.

Trading on a Summary Level Forecast

The PMRU solution also allows traders to trade in forecasts in summary metrics. To maintain consistency, PMRU method follows a 3 step process.

1. Summary metric is traded, trading action causes metric to change
2. Bottom level metrics that sum to the traded summary metric are adjusted relative to (e.g. in proportion to) their share of the summary metric pre trading.
3. Other summary metrics related to the adjusted bottom level metrics are adjusted For example, if based on the data in FIG. 4, a trader thought that the total sports products sales in Reg 1 should be higher than 31, this trader could trade that particular metric (buy the shares). This would cause the price (and the forecast metric) to rise. In this example (FIG. 5) this buying action causes the metric to rise from 31 to 34 (increase of 3).

To maintain consistency of the bottom level metrics (sales by product in region 1) related to this summary metric, these bottom level metrics are adjusted relative to (e.g. in proportion to) their share of the summary metric before the trading event. For example, Sports Product A represented 35% of the Sports Products total before the trading. After the trade, Sports Product A will still represent 35% of the Sports Products total so will be adjusted from 11 (35% of 31) to 12.1 (35% of 34).

Once the bottom level metrics are adjusted, the summary metrics related to the adjusted bottom level metrics are adjusted (FIG. 6) to maintain consistency.

In this way, although only one metric was traded, an additional 9 metrics were adjusted (3 bottom level and 6 summary) and the matrix of metrics remains consistent.

Note: while the examples illustrate a set of metrics on two dimensions (Regions and Products) in some examples, there may be more than two dimensions. In addition, the examples illustrate forecasts of sales revenue, in some examples the metric forecasted could include other important metrics such as costs or headcounts or profits etc.

The invention claimed is:

1. A method of managing prices of securities using an automated market maker, comprising:
   using the automated market maker to adjust a first price for a first security in a first market, in dependence on trades of the first security; and
   using the automated market maker to adjust a second price for a second security in a second market, in dependence on trades of the first security and trades of the second security.

2. The method of claim 1, where using the automated market maker to adjust the first price further comprises using the automated market maker to adjust the first price in dependence on trades of the second security.

3. The method of claim 2, where:
   one of the first market and the second market is a lower level market and the other of the first market and the second market is a summary market;
   using the automated market maker to adjust the first price in dependent on trades of the second security includes using the automated market maker to adjust the first price as a function of a mathematical relationship between the first market and the second market; and
   using the automated market maker to adjust the second price in dependence on trades of the first security includes using the automated market maker to adjust the second price as a function of an inverse of the mathematical relationship between the first market and the second market.

4. The method of claim 1, where:
   one of the first market and the second market is a lower level market and the other of the first market and the second market is a summary market; and
   using the automated using the automated market maker to adjust the second price in dependence on trades of the first security includes using the automated market maker to adjust the second price as a function of a mathematical relationship between the first market and the second market.

5. The method of claim 1, embodied in a method of managing a prediction market, where the first security represents predicted outcome of the first event, where the second security represents predicted outcome of the second event, and where using the automated market maker to adjust the second price includes adjusting a group prediction of the outcome of the second event in dependence on trades of the first security and trades of the second security.

6. The method of claim 1, where each of the first price and the second price is expressed in units of a national monetary currency.

7. The method of claim 1, further comprising generating a display in dependence on adjustment of the second price.

8. The method of claim 7, where the display is generated in dependence on adjustment of the first price.

9. The method of claim 8, where generating the display includes updating the display in a manner representing substantially concurrent adjustment of the first price and second price each in dependence on trades of the first security and trades of the second security.

10. A method of managing pricing of securities using an automated market maker, the comprising:
    using the automated market maker to adjust a first price of a first security in dependence on trades in a first market;

using the automated market maker to adjust a second price of a second security in dependence on trades in a second market; and where adjusting each of the first price and the second price includes adjusting the respective price in a manner that maintains consistency between the first market and the second market in accordance with a mathematical dependence between the first market and the second market.

11. The method of claim 10, embodied as a method of operating a prediction market, in which the first securities represent predictions for the outcome of a first event and the second securities represent predictions for the outcome of a second event, and the outcome of the second event is correlated with the outcome of the first event.

12. The method of claim 10, where adjusting the first price includes generating a first revised price, where adjusting the second price includes generating a second revised price, and where the method further comprises generating a display dependent on each of the first revised price and the second revised price.

13. The method of claim 10, where:
one of the first market and the second market is a lower level market and the other of the first market and the second market is a summary market;
using the automated market maker to adjust the first price includes using the automated market maker to adjust the first price in response to trades in the second market as a function of a mathematical relationship between the first market and the second market; and
using the automated market maker to adjust the second price includes using the automated market maker to adjust the second price in response to trades in the first market as a function of an inverse of the mathematical relationship between the first market and the second market.

14. A market maker computer product adapted to automatically adjust a first price depending on first trades in a first market and to automatically adjust a second price depending on second trades in a second market, where, in adjusting the respective prices, the market maker computer product is to dynamically balance each of the first and second prices in response to both the first trades and the second trades in accordance with at least one mathematical algorithm representing correlation between the first market and the second market, and where the marked maker computer product is embodied as instructions stored on non-transitory computer-readable media.

15. In a system in which participants are permitted to trade in securities, each security associated with one of a first market or a second market, and in which an automated market maker is used to set prospective pricing for each market in dependence on trades in the respective market, an improvement comprising:
linking the first and second markets according to a mathematical dependency; and
using the automated market maker to set the prospective pricing for trades in the first market in dependence on the trades in the first market, and to set the prospective pricing for trades in the second market in dependence on trades in the first market and in dependence on trades in the second market according to the mathematical dependency.

16. The improvement of claim 15, where using the automated market maker further comprises using the automated market maker to set the prospective pricing for trades in the first market in dependence on trades in the second market.

17. The improvement of claim 16, where:
one of the first market and the second market is a lower level market and the other of the first market and the second market is a summary market;
using the automated market maker to set prospective pricing for trades in the first market in dependence on trades in the second market includes setting the prospective pricing for trades in the first market as a function of the trades in the second market and an inverse of the mathematical dependency.

18. The improvement of claim 15, further comprising generating a display in a manner that represents substantially concurrent adjustment of the prospective pricing for trades in the first market and adjustment for the prospective pricing for trades in the second market responsive to trades in each respective one of the first market and the second market.

19. The improvement of claim 15, where the system is a prediction market in which each security represents outcome of a respective event, each trade in a respective security represents a participant forecast as to the outcome of the respective event, and each market represents a group prediction by participants as to the outcome of the respective event in dependence on securities traded for the respective event, and where using the automated market maker includes setting prospective pricing for trades in the second market in dependence on group predictions for each respective event.

* * * * *